United States Patent [19]
Hettinga et al.

[11] Patent Number: 5,496,508
[45] Date of Patent: Mar. 5, 1996

[54] METHOD OF COMPRESSING AND COOLING PLASTIC PURGE AS IT EMANATES FROM A PLASTIC INJECTION MOLDING MACHINE

[76] Inventors: Siebolt Hettinga, 2123 NW. 111th St., Des Moines, Iowa 50325; Peter J. Aretz, 5368 NW. 88th Ct., Johnston, Iowa 50131

[21] Appl. No.: 350,624

[22] Filed: Dec. 7, 1994

Related U.S. Application Data

[62] Division of Ser. No. 45,513, Apr. 8, 1993, abandoned.

[51] Int. Cl.⁶ .................................................. B29C 45/17
[52] U.S. Cl. ......................... 264/37; 264/39; 264/328.1
[58] Field of Search ........................... 264/37, 39, 328.1, 264/214; 425/140, 294, 335, 336, 363, 367, 369

[56] References Cited

U.S. PATENT DOCUMENTS

| | | | |
|---|---|---|---|
| 3,635,628 | 1/1972 | Cook, Jr. ................................. | 425/151 |
| 4,254,068 | 3/1981 | Otsuka ..................................... | 264/37 |
| 4,545,538 | 10/1985 | Prew ........................................ | 241/73 |

FOREIGN PATENT DOCUMENTS

| | | | |
|---|---|---|---|
| 57-191030 | 11/1982 | Japan ....................................... | 264/39 |
| 59-229326 | 12/1984 | Japan ....................................... | 264/39 |
| 62-240520 | 10/1987 | Japan ....................................... | 264/39 |
| 1593966 | 9/1990 | U.S.S.R. .................................. | 264/39 |

OTHER PUBLICATIONS

J. Boyden, "Automatic Scrap Recycling", *Modern Plastics Encyclopedia*, 1965, pp. 904–910.

*Primary Examiner*—Jill L. Heitbrink
*Attorney, Agent, or Firm*—Brian J. Laurenzo; Kent A. Herink; James R. Foley

[57] ABSTRACT

A method and apparatus for recycling pure which is disgorged from a plastic injection molding machine. The apparatus has a hopper which is placed below the injection nozzle of an injection molding machine. Purge is released from the injection nozzle and falls into a hopper located on the apparatus. From the hopper the purge is drawn downward by two coacting compression rollers which have the dual function of compressing and forming the purge into a recyclable form. After compression and forming the purge is available for storage or reuse.

15 Claims, 2 Drawing Sheets

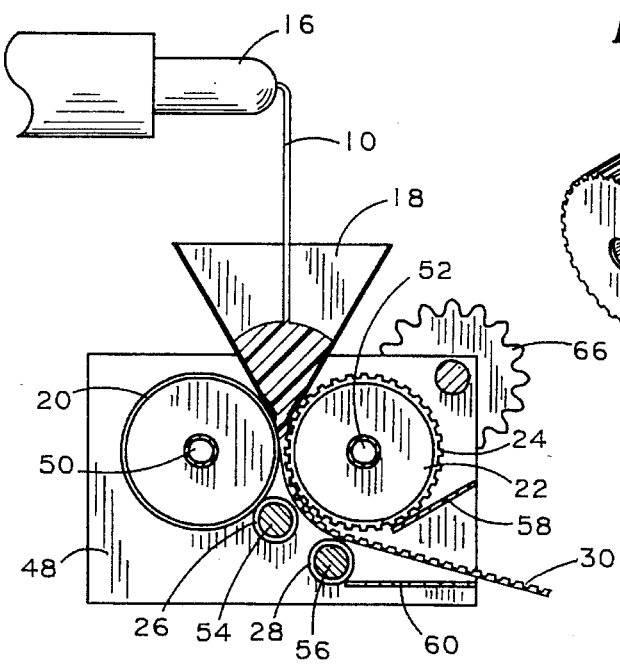
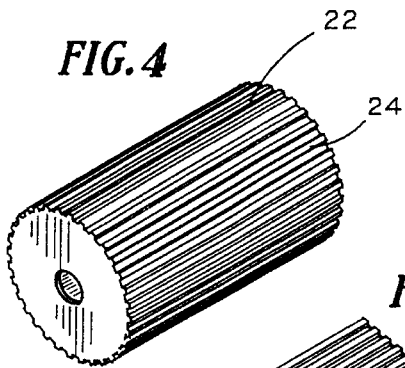
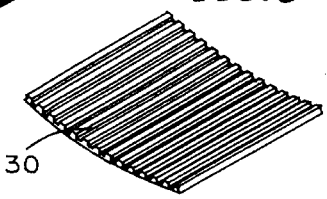
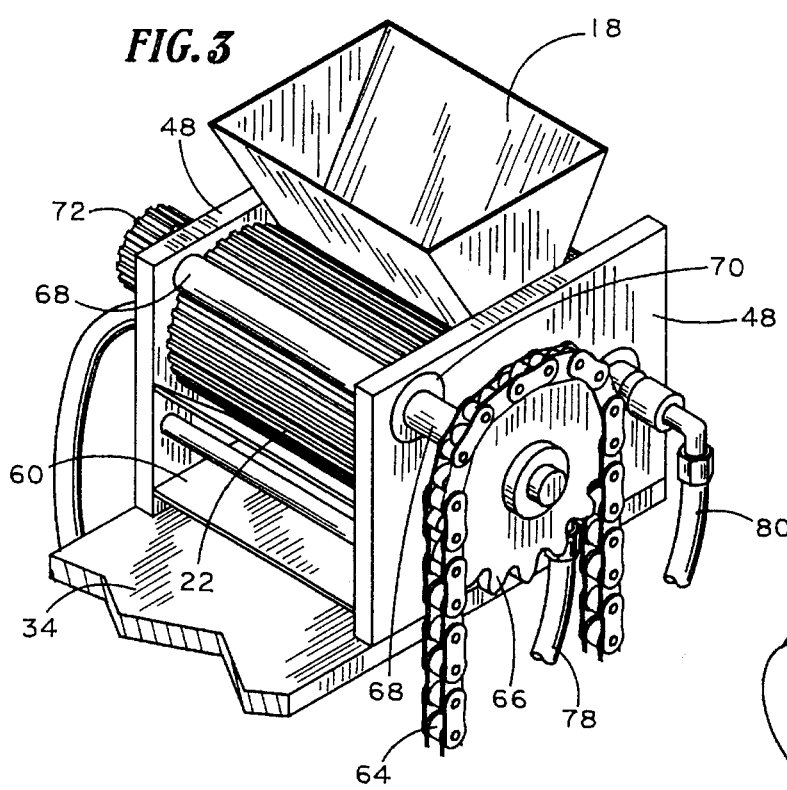
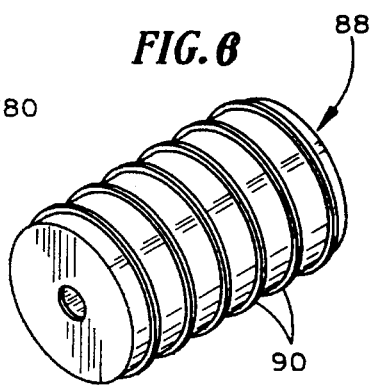

5,496,508

METHOD OF COMPRESSING AND COOLING PLASTIC PURGE AS IT EMANATES FROM A PLASTIC INJECTION MOLDING MACHINE

This application Ser. No. 08/045,513, filed Apr. 8, 1993 now abandoned.

BACKGROUND OF THE INVENTION

The present invention relates to a method for recycling plastic purge wherein flowable purge is received directly from a plastic molding machine and compressed into a form suitable for recycling.

In the injection molding of plastic material the initial start-up of the injection molding process typically involves bringing the plastic to the correct plasticity while simultaneously bringing the mold to the correct temperature. To bring the plastic to the correct plasticity, plastic must often be forced through the injection barrel of the plastic injection molding machine several times before the correct plasticity is achieved. The plastic ejected from the injection barrel during these initial runs cannot be used to mold plastic parts because of the incorrect plasticity. Furthermore, the plastic cannot be immediately reprocessed through the injection barrel because the plastic is no longer in a form suitable for reinjection. Although the plastic may be allowed to harden and then reground into pellets in a large scale grinder, this procedure is often not done due to the small amount of plastic recovered and the large amount of time involved in transporting the hardened purge to a large scale grinder. Typically, the purge is allowed to fall on the floor of the work area and harden. The purge is later removed and typically thrown away to end up in an incinerator or landfill. Although purge droppings are generally only about one to five pounds in weight, each molding machine may produce two or three purge droppings per run and may be involved in ten or more runs per day. Given that a typical plastic molding plant has several plastic molding machines in operation, the amount of purge droppings produced can become fairly significant adding up to increased cost as well as the increased detrimental effect to the environment of having such droppings disposed of in a landfill or incinerated.

The prior art method of recycling such droppings involves the transportation of such droppings to a large scale grinder which grinds the droppings up into pellet size portions which may then be reused in the injection molding process. Because the droppings are so large and of such an irregular shape, small pelletizers available at most plastic injection molding plants are not capable of handling such large irregular portions of plastic. The droppings must, therefore, be collected, cleaned of any debris, shipped to a large material grinder, pelletized in the grinder, repackaged, and returned to the plant for reprocessing. Rarely does the value of the pellets returned from this procedure outweighed the cost of the procedure itself. Because of this inefficiency, droppings are typically thrown away and not recycled.

SUMMARY OF THE INVENTION

Accordingly, it is an object of the present invention to provide a method for recycling plastic purge into sheets which may be easily stored and converted into a form suitable for reuse in the plastic molding process.

A further object of the present invention is to provide a method for keeping plastic purge free of contamination until it can be converted to reuse in the plastic molding process.

Another object of the present invention is to provide a method for processing plastic purge so that the plastic purge does not pose a hazard lying on the floor during the plastic molding process.

Still another object of the present invention is to provide an apparatus for recycling purge into sheets so that the plastic purge may be stored and converted into a form suitable for reuse in the plastic molding process.

These, and other objects of the present invention will become apparent upon reference to the following specification, drawings, and claims.

By the present invention, it is proposed to overcome the difficulties encountered heretofore. To this end, a method is provided for recycling plastic purge into usable product. A purge compression assembly is provided along with a purge storage assembly. The purge storage assembly is placed below the purge outlet of a plastic molding machine and purge is drained from the outlet of the plastic molding machine into the purge storage assembly. The purge is transferred from the purge storage assembly to the purge compression assembly where the purge is compressed. The purge is then removed from the purge compression assembly and is available for storage or reuse.

In the preferred embodiment of the present invention, the apparatus for recycling plastic purge comprises a portable stand on which is placed a hopper and two powered rollers which form the purge into sheets as the purge falls through the hopper. The portability of the apparatus allows the apparatus to be placed directly beneath a plastic molding machine as the molding machine is being purged. After the machine has been fully purged the apparatus may be easily removed to allow extra room for the molding machine to operate during the plastic injection molding process.

BRIEF DESCRIPTION OF THE DRAWINGS

In the drawings:

FIG. 2 is a side elevation shown in cross-section of the apparatus showing the hopper outlet into the two rollers;

FIG. 3 is a perspective view of the upper portion of the purge recycling apparatus;

FIG. 4 is a perspective view of a corrugated roller;

FIG. 5 is a perspective view of a corrugated piece of purge processed in accordance with the method of the present invention;

FIG. 6 is a perspective view of a line roller.

DETAILED DESCRIPTION OF THE INVENTION

Figure 1:
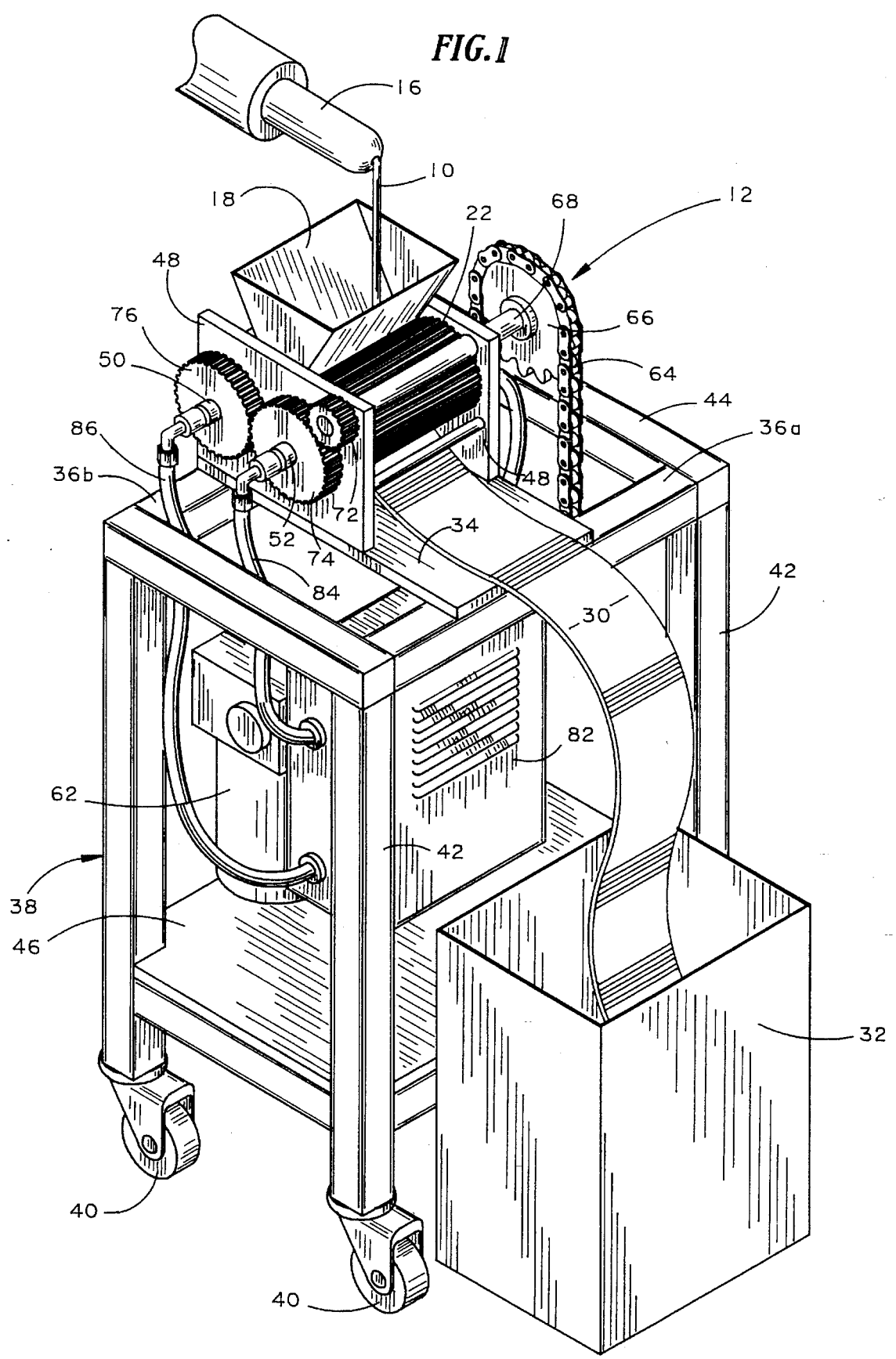
FIG. 1 is a perspective view of the purge recycling apparatus and injection nozzle showing the purge being ejected from the nozzle and into the hopper of the apparatus.

A method of recycling plastic purge 10 from a plastic molding machine (not shown) whereby the plastic purge 10 is deposited into a purge recycling apparatus 12 and the purge 10 is compressed into a sheet 14 suitable for reuse.

According to the preferred embodiment of the present invention, plastic purge 10 is ejected from the injection nozzle 16 of a plastic injection machine (not shown) into a hopper 18 located on the purge recycling apparatus 12. The purge 10 exits the hopper 18 to be compressed between two rollers 20 and 22. In the preferred embodiment, one roller 20 is a compression roller with a flat cylindrical surface area, while the other roller 22 is a form roller whose cylindrical surface is fitted with ribs 24 to imprint a corrugated pattern onto the purge 10 as the purge 10 passes between the rollers 20 and 22. Various types of form rollers 22 may be used alone or in combination to produce various forms of compressed purge 30. FIG. 6 shows a string roller 88 with ribs 90 following the circumference of the roller 88. This roller 88 produces compressed purge which can be easily divided into narrow strips for processing. Guide rollers 26 and 28 are provided to guide the compressed purge 30 to the storage area 32 of the purge recycling apparatus 12. Material deflectors 58 and 60 are also provided to prevent the compressed purge 30 from remaining on the rollers 20 and 22 and to guide the compressed purge 30 into the storage area 32.

In the figures, there is shown a purge recycling apparatus 12 (FIG. 1) with a frame 38 which is provided with wheels 40 so that the apparatus 12 may be moved quickly into and out of proximity with a plastic molding machine (not shown). In the preferred embodiment, the frame 38 is constructed of four steel legs 42. A support assembly 44 consisting of four steel bars welded into a hollow steel square is welded to the tops of the legs 42 and a platform 46 is welded near the lower portions of the legs 42. The platform 46 consists of a square steel plate which has each corner cut away to allow the legs 42 to be welded thereto. The platform 46 adds support to the frame 38 and may be modified to provide storage for processed purge 30.

A support stand 34 consisting of a steel plate is welded to two of the bars 36a–b forming the support assembly 44 FIG. 1). Two side plates 48 are mounted to the stand 34 by means of bolts or similar securement means. A hopper 18 is secured to the side plates 48 above a pair of rollers 20 and 22 which are also mounted to the side plates 48 (FIG. 2). The rollers 20 and 22 are mounted to the side plates by means of axles 50 and 52 which protrude through bores in the side plates 48.

Similarly, guide rollers 26 and 28 are mounted to the side plates 48 by means of axles 54 and 56 secured to the side plates 48 (FIG. 2). In the preferred embodiment of the present invention two material deflector plates 58 and 60 are mounted to the side plates 48 and are designed to guide compressed purge 30 away from the guide roller 28 and form roller 22. The upper material deflector plate 58 consists of a flat rectangular piece of steel which is secured to the side plates 48 and positioned nearly tangentially to the circumference of the form roller 22. This upper deflection plate 58 prevents the compressed purge 30 from sticking to the form roller 22 and following the circumference of the form roller 22 around and engaging the compression roller 20 again which would clog the apparatus 12. The lower material deflection plate 60 also consists of a rectangular steel plate secured to the side plates 48. The lower material deflection plate 60 prevents the compressed purge 30 from following the circumference of the lower guide roller 28 and also serves to guide the compressed purge 30 toward the compressed purge storage area 32.

In the preferred embodiment of the present invention, an electric motor 62 is secured to the frame 38 (FIG. 1). The motor 62 drives a chain 64 which is operably connected to a transfer wheel 66. The transfer wheel 66 is secured to one end of an axle 68 which passes through both side plates 48. Preferably bearing assemblies 70 are mounted into the side plates 48 to allow the axle 68 freer rotation (FIG. 3). The opposite end of the axle 68 is connected to a drive cog 72. The teeth of the drive cog 72 are drivably connected to the teeth of a form roller cog 74 secured to the protruding end of the form roller axle 52 (FIG. 1). The form roller cog 74, in turn, is drivably connected to a compression roller cog 76 secured to the protruding end of the compression roller axle 50.

As the form roller cog 74 and compression roller cog 76 turn, this rotation is transferred by the axles 50 and 52 to the form roller 22 and compression roller 20. Because the form roller cog 74 and compression roller cog 76 are operably connected, the form roller 22 and compression roller 20 turn in opposite directions to pull purge 10 from the hopper 18 and between the rollers 20 and 22.

In the preferred embodiment the drive cog 72 is about eight centimeters in diameter while the remaining two cogs 74 and 76 are about twenty centimeters in diameter. All three cogs 72–76 are approximately three centimeters thick and secured to their respective axles 50, 52, and 68 approximately four centimeters from the side plate 48 to avoid contact with the side plate 48 during operation. The three cogs 72–76 are all in drivable connection so that when the electric motor 62 turns master wheel 64, the chain 68 connected thereto turns the transfer wheel 66. As the axle 68 to which the transfer wheel 66 is secured turns, the drive cog 72 secured to the opposite end of the axle 68 transfers power to the form roller cog 74 and the compression roller cog 76. The electric motor 62 is preferably of the variable speed variety so the speed of the rollers 20 and 22 can be varied in accordance with particular viscosity and temperature conditions of the purge 10.

In the preferred embodiment, both the compression roller 20 and form roller 22 are composed of hollow steel which allows a coolant to be circulated through the rollers 20 and 22 during operation. Both the compression roller axle 50 and form roller axle 52 are hollow to allow a coolant material (not shown) to be circulated into the interior of the rollers 20 and 22 through the axles 50 and 52. The portions of the axles 50 and 52 lying within the interior of the rollers 20 and 22 are perforated to allow the coolant material to circulate into the rollers 20 and 22. The axles 50 and 52 are preferably occluded in the center to force the coolant to circulate out of the axles 50 and 52 and into the interior of the rollers 20 and 22. This occlusion or "plug" in the axles 50 and 52 prevents the coolant from passing directly through the axles without entering the rollers 20 and 22.

Operably connected to the axles 50 and 52 are coolant removal hoses 78 and 80 which feed from the axles 50 and 52 into a heat exchanger 82 secured to the frame 38 (FIGS. 1 and 3). The heat exchanger 82 removes heat from the coolant into the atmosphere and returns the coolant through a pair of coolant return hoses 84 and 86 to the rollers 20 and 22.

Both the compression roller 20 and form roller 22 are cooled, which acts to draw heat out of the plastic purge 10 as the purge 10 passes between the rollers 20 and 22 (FIG. 2). As heat is drawn out of the compressed purge 30, tile purge 30 begins to solidify. After passing between the rollers 20 and 22, the compressed purge 30 has solidified sufficiently to retain the shape which the form roller 22 has imprinted on the purge 30, yet remains supple enough to be deflected by the guide rollers 26 and 28 toward the material deflection plates 58 and 60. The preferred embodiment of the present apparatus has a compressed purge storage area 32 consisting, in the preferred embodiment of a steel box positioned near the frame which allows the compressed purge 30 deflected by the material deflection plates 58 and 60 to be stored and protected from contamination until the compressed purge 30 is required. It should be noted that the compressed purge storage area may alternatively be secured to the platform to allow the entire apparatus 12 to be mobile.

In the recycling of plastic purge by the method of the present invention, the purge recycling apparatus 12 is placed into position below the injection nozzle 16 of an injection molding machine (not shown) so that the hopper 18 is positioned to catch plastic purge 10 as the purge 10 is ejected from the nozzle 16 (FIG. 1). Until the injection machine has reached operating temperature the purge 10 ejecting from the nozzle 16 of the injection machine is deposited into the hopper 18 and remains in the hopper 18 until the purge 10 is drawn through the bottom of the hopper 18 and between the rollers 20 and 22. Preferably, the rollers 20 and 22 are rotating as the purge 10 is placed into the hopper 18. The rollers 20 and 22 are rotating so that the purge 10 does not set up or solidify within the hopper 18 to the point where the plastic purge 10 can no longer be drawn through the rollers 20 and 22 and, therefore, must be removed through the top of the hopper 18.

As the electric motor 62 turns, the rollers 20 and 22, the purge 10 is drawn down through the hopper 18 and between the rollers 20 and 22. The rollers 20 and 22 act to compress the purge 10 while the form roller 22 additionally acts to imprint the purge 10 with a corrugation or similar pattern which will allow the compressed purge 30 to be more easily manipulated and recycled (FIGS. 2 and 4). As the purge 10 is compressed between the rollers, the rollers 20 and 22 act to draw heat out of the purge 30 and into the coolant passing through the rollers 20 and 22, thereby cooling and solidifying the purge 30 as the purge 30 is compressed (FIG. 1). The cooling system of the present invention prevents the rollers 20 and 22 from overheating which would prevent the rollers 20 and 22 from effectively solidifying the purge 10 as the purge 10 is passed between the rollers 20 and 22.

After the purge 30 has been compressed between the two rollers 20 and 22, the partially hardened compressed purge 30 continues to follow the circumference of the form roller 22 (FIG. 2). The corrugations or similar pattern act to hold the compressed purge 30 to the form roller 22 rather than to the compression roller 20. The guide roller 26 is provided, having its axle 54 connected to both side plates 58 and the roller 26 which freely rotates around the secured axle 54. This roller 26 is positioned below the point at which the rollers 20 and 22 compress the purge 10 and is positioned slightly toward the compression roller 20. This guide roller 26 guides the compressed purge 30 back toward the form roller 22 if the compressed purge 30 becomes detached from the form roller 22. The guide roller 26 also prevents the compressed purge 30 from following the circumference of the compression roller 20 which could cause the apparatus 12 to become clogged with purge 10.

The second guide roller 28 is provided and also freely rotates around its axle 56 secured to the two side plates 48 (FIG. 2). This lower guide roller 28 guides the compressed purge 30 from the first guide roller 26 toward the compressed purge storage area 32. The lower guide roller 28 also prevents the compressed purge 30 from passing below the lower material deflection plate 60 and onto the floor.

The upper material deflection plate 58 is provided to release compressed purge 30 from the form roller 22 if the compressed purge 30 becomes stuck to the roller 22 (FIG. 2). The lower material deflection plate 60 is provided to guide the compressed purge 30 toward the compressed purge storage area 32. The compressed purge storage area 32 consists essentially of a hollow steel cube into which the compressed purge 30 is deflected and thereafter begins to curl up upon itself thereby forming a roll of compressed purge 30. This compressed roll may be easily extracted from the compressed purge storage area 32 and either pelletized or recycled for later use.

The foregoing description and drawings merely explain and illustrate the invention and the invention is not limited thereto, except insofar as the claims are so limited, as those skilled in the art who have the disclosure before them will be able to make modifications and variations therein without departing from the scope of the invention. For example, it is contemplated that various types of compression and form rollers may be employed to produce compressed purge suitable for divers applications. It is further contemplated that only a single roller need be powered and that only one roller may be cooled or neither roller need be cooled.

I claim:

1. A method for compressing and cooling plastic purge as it emanates from a plastic injection molding machine and for compressing the purge into recyclable sheets for grinding and remolding, said method comprising:
   (a) providing a plastic injection molding machine having a purge outlet nozzle;
   (b) filling said plastic injection molding machine with a plastic material;
   (c) heating said plastic material within said plastic injection molding machine;
   (d) forcing said plastic material through said nozzle;
   (e) placing a hopper, having a purge inlet and a purge outlet, below said nozzle;
   (f) providing at least two rollers operably secured to and below said hopper;
   (g) directing purge from said nozzle to said hopper;
   (h) transferring said purge from said hopper between said at least two rollers;
   (i) revolving at least one of said at least two rollers sufficiently to compress said purge as said purge exits from said hopper;
   (j) compressing said purge between said at least two rollers to a thickness sufficient for subsequent reprocessing; and
   (k) removing said purge from said at least two rollers.

2. The method of claim 1, further comprising cooling said purge as said purge is compressed between said at least two rollers.

3. The method of claim 1, further comprising the steps of grinding said purge into pellets of a sufficient size for reheating within a plastic injection machine and reheating said pellets within a plastic injection molding machine until said pellets form a flowable molding material.

4. The method of claim 1, wherein said at least two rollers are cooled as said purge passes between said at least two rollers.

5. The method of claim 1, wherein at least one of said at least two rollers is provided with indentations which transfer a pattern onto said purge passing between said at least two rollers.

6. A method for compressing and cooling plastic purge as it emanates from a plastic injection molding machine and for compressing the purge into recyclable sheets for grinding and remolding, said method comprising:
   (a) providing a plastic injection molding machine having an outlet nozzle through which plastic material is ejected from said plastic injection molding machine;
   (b) placing a plastic material in said plastic injection molding machine;
   (c) plasticizing said plastic material within said plastic injection molding machine;
   (d) providing a plastic purge recycling apparatus comprising:
      (i) a mobile support frame, said frame having a compressed purge storage area;

(ii) a hopper mounted to said mobile support frame, said hopper having a purge inlet and a purge outlet;

(iii) a first roller mounted to said support frame so as to receive purge exiting from said purge outlet of said hopper;

(iv) a second roller mounted near said first roller so as to compress said purge against said first roller as said purge exits said purge outlet of said hopper; and (v) compressed purge guiding means mounted to said support frame for guiding said purge away from said rollers after said purge is compressed between said rollers;

(e) placing said purge recycling apparatus below said nozzle of said plastic injection molding machine in a position to allow purge exiting from said nozzle to be deposited within said hopper of said purge recycling apparatus;

(f) ejecting purge from said plastic injection molding machine through said nozzle and into said hopper of said purge recycling apparatus;

(g) rotating said rollers of said purge recycling apparatus at a rate sufficient to compress said purge between said rollers as said purge exits purge outlet of said hopper;

(h) removing said compressed purge from said rollers after said purge has hardened; and (i) directing said compressed hardened purge into a compressed purge storage area.

7. The method of claim 6, further comprising cooling said purge as said purge is compressed between said first roller and said second roller.

8. The method of claim 6, further comprising the steps of grinding said purge into pellets of a sufficient size for reheating within a plastic injection machine and reheating said pellets within a plastic injection molding machine until said pellets form a flowable molding material.

9. The method of claim 6, further comprising cooling said first roller sufficiently to harden said purge as said purge is compressed between said first roller and said second roller.

10. The method of claims 6, wherein said first roller is provided with indentations which transfer a pattern onto said purge passing between said first roller and said second roller.

11. The method of claim 6, wherein said first roller is powered.

12. The method of claim 11, wherein said second roller is powered.

13. The method of claim 6, wherein said first roller is a form roller and said second roller is a compression roller.

14. The method of claim 6, wherein said first roller and said second roller are compression rollers.

15. The method of claim 6, wherein said first roller and said second roller are form rollers.

* * * * *